INVENTOR.
EDWARD V. CORDES JR.
BY Williams, David,
Hoffmann & Yount
ATTORNEYS

Nov. 7, 1967   E. V. CORDES, JR   3,351,907
MACHINE TOOL CONTROL SYSTEM HAVING MEANS FOR
IGNORING INVALID COMMAND SIGNALS
Filed May 3, 1963                              4 Sheets-Sheet 4

FIG. 4

INVENTOR.
EDWARD V. CORDES JR.
BY
Williams, David,
Hoffmann & Fount
ATTORNEYS

United States Patent Office 3,351,907
Patented Nov. 7, 1967

3,351,907
MACHINE TOOL CONTROL SYSTEM HAVING MEANS FOR IGNORING INVALID COMMAND SIGNALS
Edward V. Cordes, Jr., Greenwood Lake, N.Y., assignor to The Warner & Swasey Company, Cleveland, Ohio, a corporation of Ohio
Filed May 3, 1963, Ser. No. 277,912
7 Claims. (Cl. 340—147)

ABSTRACT OF THE DISCLOSURE

The present invention relates to a machine which includes a code reader for reading coded information where certain of the coded information is to be ignored while other of the coded information is to be acted upon by the machine and particularly to such a machine where the information can be selectively accepted and acted upon by the machine or rejected and ignored by the machine.

Commonly information members have coded words or commands thereon which are to control the various operations of the machine. Under certain circumstances it is desirable that the machine ignore certain commands which under other circumstances are to be acted upon. For simplicity of description, the words or commands which the machine is set to reject and not act upon even though under certain circumstances these commands or words would be acted upon will be called ignore or invalid words or commands while the commands or words which the machine is preset to accept and act upon will be referred to as valid words or commands.

The present invention is particularly suitable for use in machine tools where a work table is to be positioned relative to a tool. The information member for such a machine will often include commands for turning off and on a cooling fluid or for performing other machine functions in addition to the commands for positioning the table. Under certain circumstances it is unnecessary to have the machine respond to certain of the commands or the coded information may be used to control a machine where certain of the commands cannot be performed by the machine. In such a circumstance it is desirable that it is possible to use the same coded information member even though certain commands cannot be performed.

Accordingly, it is an object of the present invention to provide a new and improved system for controlling the operation of a machine with a coded information member in which an information member having commands thereon which under certain circumstances are to be acted upon will be automatically ignored by the system and the other commands acted upon and performed by the machine.

Accordingly, it is an object of this invention to provide an improved system for controlling the operation of a machine tool.

It is another object of this invention to provide an improved system for controlling the operation of a machine tool which system accepts predetermined signals and ignores unwanted or invalid signals from a series of command signals.

It is a further object of this invention to provide an improved system for controlling a machine tool to perform certain functions such as automatically to position the work table in response to a series of signals, which series may include invalid or unwanted signals.

It is a still further object of this invention to provide an improved system for controlling the operation of a machine tool, which system accepts valid signals and ignores invalid signals from a series of command signals and in which the system includes means for quickly and easily converting the system to ignore a signal which i previously accepted or to accept as valid a signal which it previously ignored.

Briefly, in accordance with aspects of this invention the system includes means for detecting command signals which means in this particular embodiment, includes a punched tape containing a permutation code and a tape reader of conventional form. The reader reads the code from the tape and delivers electrical signals indicative of the characters or digits punched in the tape to subsequent circuits. These electrical signals are directed to an electrical signal permutation responsive means which responds in a selective fashion to the electrical signals to deliver to a single one of a plurality of output terminal an electrical signal indicative of a digit or character. In this particular illustrative embodiment the means for determining the particular character or digit includes a relay tree. It is well known in the art, however, that diode or other electrical or electronic devices may be arranged to produce the same result.

The output from the individual terminals may be connected to one or the other of two output channels designated as "valid" 'and "ignore" busses and these connections may be quickly and easily changed by means o movable straps. The output from these individual terminals which have been selected as valid outputs can also be connected to other means to respond to predetermined electrical signals. For example, the other mean may be a machine tool servo system which accurately positions the work table or it may be a machine function circuit to select a tool or to operate a tool.

If the signal is one of those which are to be ignored the tape reader is stepped to a position to read the nex command signal and the system otherwise ignores th signal. Assuming, for example, that the signal is a vali work table movement signal, it must be determined wheth er the signal is to control the movement of the work tabl in the "X" or the "Y" axis. The determination of whethe the signal is to control work table movement along th X or the Y axis is determined by the permutation cod responsive relay tree and if the signal is to control th X axis movement, then this signal is translated to a input terminal of the X control circuit.

The X control circuit provides a plurality of response to its input signals including actuating the tape reade and setting a plurality of values in storage devices which in this particular instance, are relays. The relays are se lected through a stepping register which moves progres sively along a predetermined number of switch position in response to certain of the valid command signals an completes circuits of the storage relays. When actuatec these storage relays actuate their associated contact which are connected in a servo system command networl Another response of the X control circuitry determine the direction of work table movement and initiates th operation of the work table drive servo system. The serv system then responds to the predetermined initiate signe to move the work table until a position is obtained, whic position corresponds with the predetermined values store in the storage relays. When the servo system has reache a balance, it delivers a "completion" indicative signal t restart the operation of the tape reader to read the nex command and the system continues to follow or respon to valid command signals until a "stop" command reached. A similar arrangement is provided in this systei for controlling work table movement in the Y axis; hov ever, because of the identity of the X and Y network only the X network will be described in detail.

The previously mentioned predetermined output te minals of the permutation responsive circuit which ai onnected to the valid bus may also be connected to circuits for performing other machine functions depending pon the particular function desired. For example, the gnals may readily be connected to circuitry for controlling tool operation, or the signals may be connected ) circuits for performing auxiliary functions such as oolant cycle control, tool selection, tool speed and rate f feed.

This system may be employed to perform a sequence f operations including but not restricted to drilling, eaming, boring, tapping, punching, contouring and illing.

These and various other objects and features of the vention will be more clearly understood from a reading f the detailed description of the invention in conjunction ith the drawing in which:

FIGURES 4a–4p are time plots of exemplary sequences f relay operations.

Figure 1:
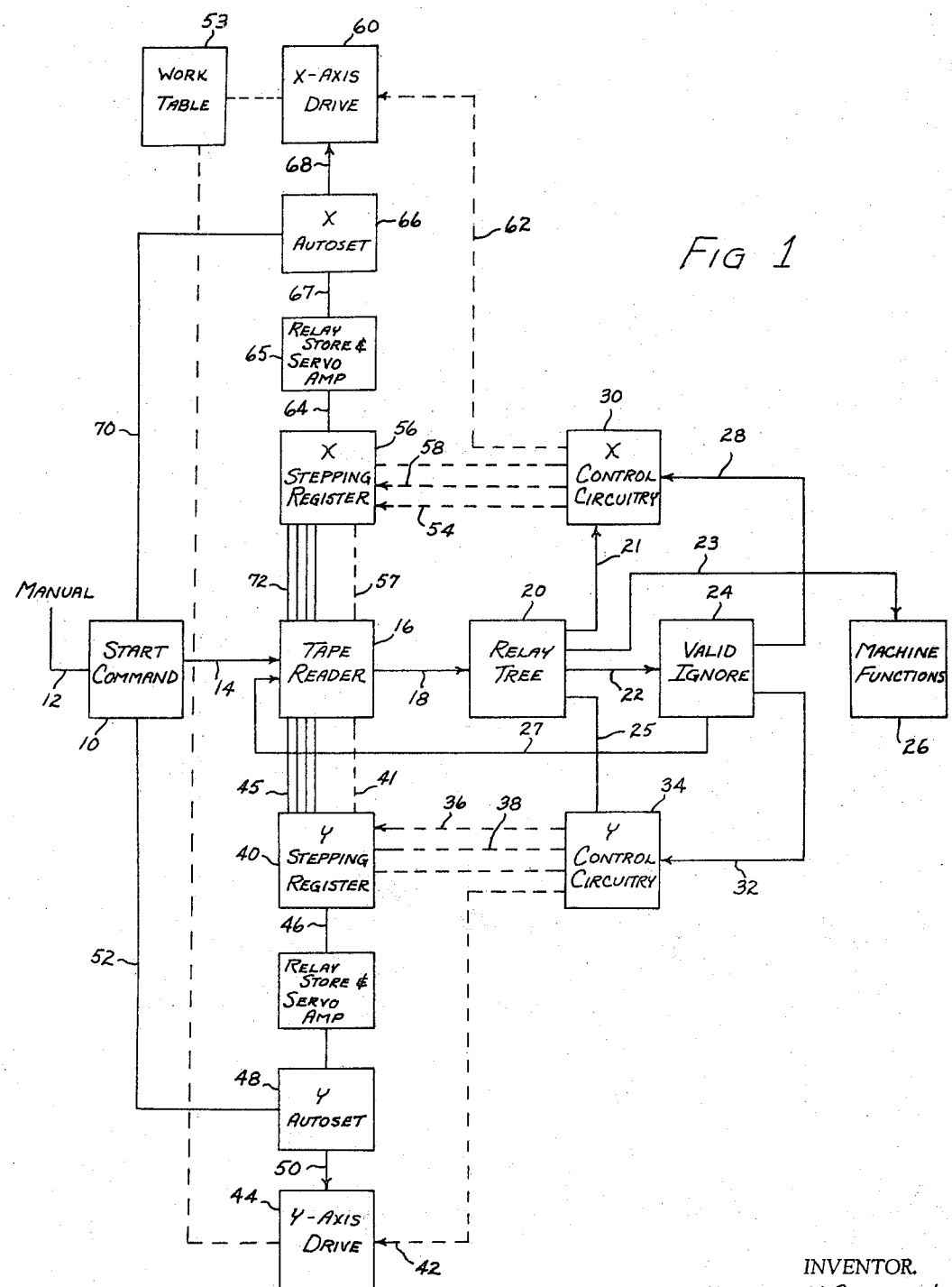
FIGURE 1 is a function block diagram of one illustrave embodiment of this invention.

Referring now to FIGURE 1, there is depicted a funcon block diagram of this system which includes a "start ommand" portion 10 having a manual input 12 and an utput 14. Although the output 14 and other output and iput arrangements throughout the system are indicated y a single line for the sake of simplicity, each single line ight represent a large number of electrical connections. he output of start command 10 is fed through line 14 ) tape reader 16, which tape reader may be of the conentional type known in the art for reading a multichanel tape. In this particular embodiment, the tape reader s adapted to read a 5 channel tape in which the letters r digits are punched in accordance with a predetermined ermutation code.

The holes in the tape are punched to provide for proramming a binary-coded decimal and letter address sysm and the holes are sensed electrically to generate outut signals. These signals are fed over a plurality of channels, indicated by line 18, to a permutation responsive neans which, in this example, is relay tree 20. The relay ree is connected to respond to the permutation code and ) select from its numerous output terminals an output erminal designed in accordance with the predetermined iput digit or character on the tape and to deliver to this elected output terminal an electrical signal indicative of he character read by the tape reader 16. The output from hese terminals is fed over a plurality of individual channels shown as line 22 to a valid-ignore circuit 24. Relay ree 20 is also connected through channel 21 to X control ircuit 30, through channel 23 to machine functions circuit 26, and through channel 25 to Y control circuit 34. Channel 23 is employed to feed signals to machine funcions circuit 26 to control the tool and the auxiliary funcions such as coolant flow.

The valid-ignore circuit 24 performs several functions. 'or example, if the signal is to be ignored, then the circuit eeds a signal back to tape reader 16 over conductor 27 hich causes the tape reader to move the tape to the ext character or digit on the tape. Assuming that the ignal is a valid signal for controlling the position of the orktable along the X axis, valid-ignore circuit 24 feeds his signal over a single conductor 28 to X control circuit 0. If, however, the signals are for the purpose of conolling the Y position of the worktable, the signals are ed over a single channel 32 to Y control circuit 34. As reviously mentioned, the portions of the system for X ontrol are identical to the portions of the system for Y ontrol and accordingly only one of these positioning arangements will be described in detail. The Y control ciruit 34 selectively delivers output signals over channel 36 through Y stepping register 40 and channel 41 to tape reader 16, signals over channel 38 to operate the Y stepping register 40 and signals over channel 42 to the Y axis drive 44. The Y stepping register receives signals over a plurality of channels 45 and delivers these signals over paths 46 to storage devices in the Y automatic setting device 48. The Y device 48 responds to these stored signals and delivers output signals to the Y axis drive over a plurality of channels indicated by line 50 and also delivers a completion signal over line 52 to the start command circuit 10 after the Y axis drive has finally positioned worktable 53 along the Y axis.

Referring again to the X control arrangement, signals from X control circuit 30 are fed through X stepping register 56 over channel 54 and to the tape reader 16 from register 56 over channel 57. Through electromechanical coupling, line 58, X control circuit 30 actuates X stepping register 56. The X control circuit also feeds an execute signal to the X axis drive 60 over channel 62. Tape reader 16 feeds signals which are to be stored in relay store 65 over a plurality of channels 72 through contacts of the X stepping register 56 and over a plurality of channels designated by the numeral 64 to storage circuits in relay store and servo amplifier 65. Advantageously, the storage circuits are responsive to signals generated from whatever code is punched in the tape and the outputs from the storage circuits are connected to provide a decimal analogue input to servo amplifier 65. The servo amplifier portion sends a signal over channel 67 to control a servo motor in autoset 66, which motor positions a limit switch (not shown) which controls the limit of movement of worktable 53 in the X direction. When the X axis drive reaches the position indicated by the limit switches positioned by autoset 68, completion signals are fed over channel 70 to the start command circuit 10.

Figure 2:
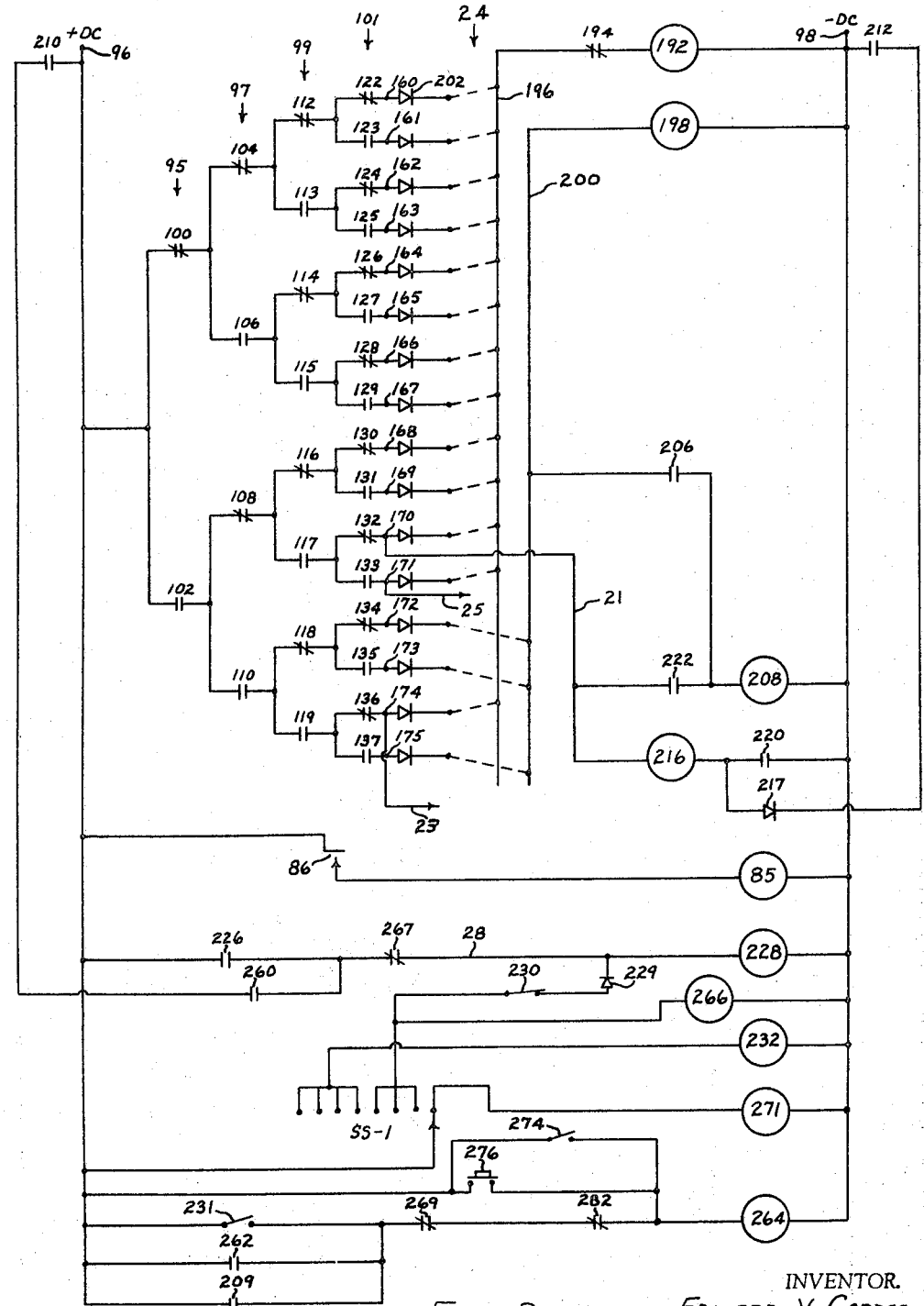
FIGURE 2 is a schematic representation of a portion f this illustrative embodiment.
Figure 3:
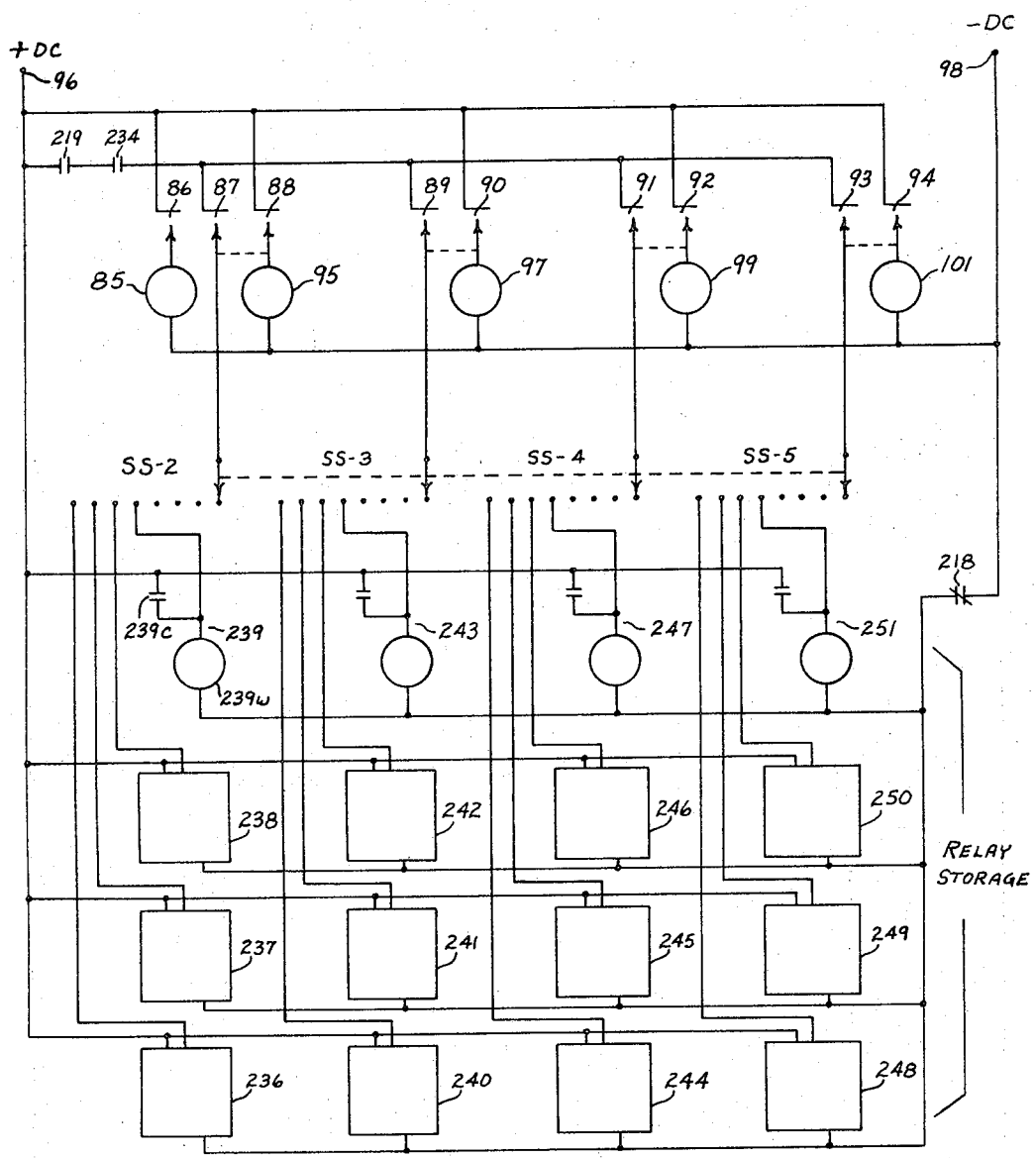
FIGURE 3 is a combined schematic and block diagram f the remaining portion of this illustrative embodiment; nd

Referring now to FIGS. 2 and 3, there is depicted in combined schematic and block form one illustrative embodiment of this invention. In the upper portion of FIG. 3, a plurality of pairs of switch contacts 86, 87, 88, 89, 90, 91, 92, 93 and 94 are shown. These are contacts operatively associated within the tape reader for reading the punched holes in the tape. In this particular embodiment groups of these contacts are associated so that each group reads a single hole in the tape. For example, contacts 87 and 88 read a single punched hole and in a similar manner contacts 89 and 90 cooperate as do contacts 91, 92 and 93, 94 to sense other holes. Contacts 86 are operatively associated with a stop relay designated 85, which relay is employed to stop the operation of the control system in a manner which will be subsequently described. One contact of each of these pairs of contacts is connected to a terminal 96 to which is applied a source of positive potential. Terminal 98 is connected to a source of negative potential. Relays 95, 97, 99 and 101 are permutation control relays to control banks of contacts in the relay tree and the contacts for these relays are shown schematically in the upper left-hand portion of FIGURE 2 in which the respective contacts are grouped in columns with the columns designated in accordance with the relay winding. Thus, relay 95 has two pairs of contacts operatively associated therewith, a first pair 100 being normally closed as indicated by the diagonal line and a normally open second pair 102, the condition being indicated by the absence of a diagonal line. It is understood that when relay 95 is operated, the normally closed contacts 100 will be opened and the normally open contacts 102 will be closed. Relay 97 has four pairs of contacts 104, 106, 108 and 110. Contacts 104 and 108 are normally closed, while contacts 106 and 110 are normally open. Relay 99 has eight pairs of contacts operatively associated therewith, namely, contacts 112 through 119. Contacts 112, 114, 116 and 118 are normally closed, while contacts 113, 115, 117 and 119 are normally open. Relay 101 has sixteen pairs of contacts operatively associated therewith, namely contacts 122–137, of which the even numbered pairs of contacts are normally closed and the odd numbered contacts are normally open. It will be understood by those skilled in the art that the contacts of relays 95, 97, 99 and 101 are connected in the form of a tree, such that the relays will sense the binary permutation code punched in the tape and connect the relay contacts in the tree so that only a single output terminal from the group of output terminals 160 through 175 is connected to terminal 96. Terminals 96 and 98, shown in FIGURE 2, correspond to terminals 96 and 98 shown in FIGURE 3, namely, those terminals to which a potential source of positive and negative polarity, respectively, is connected.

Terminal 98 is connected through "valid" relay winding 192 and a pair of normally closed relay contacts 194 to valid bus 196. Terminal 98 is also connected through "ignore" relay winding 198 to the ignore bus 200. A diode or unilateral impedance device such as diode 202 is connected between each terminal 160 through 175 of the relay tree and either the valid bus 196 or the ignore bus 200 for the purpose of isolating the circuits established through the tree from each other. Each of the output terminals 160 through 175 is an output terminal having a predetermined character designation in accordance with the code employed on the punched tape. These individual terminals may be selectively connected to the machine functions circuit to control the machine functions in accordance with a predetermined schedule. The connection or connections between these terminals and the machine functions circuit is designated by the line 23 in FIGURE 1 and this line is shown connected to terminal 174, although it might include other terminals in the group 172–175.

Any signals on the permutation code tape which are to be ignored will cause the operation of the proper combination of relays 95, 97, 99 and 101 to establish a tree circuit between terminals 96 and 98 of FIGURE 2 through ignore bus 200 and ignore relay 198. For example, as shown in dotted lines in FIGURE 2, connections are made between terminals 172, 173 and 175 and ignore bus 200. For example, at any time that contacts 102, 110 and 118 are closed, an ignore circuit will be established and the specific ignore circuit established will depend on the condition of relay 101. For example, if relay 101 is released then the circuit to the ignore bus 200 will be established through contacts 118, 134 and terminal 172. The establishment of this circuit energizes the ignore relay 198 causing the relay to close contacts 206, with cause energization of the "tape ignore continuity" relay 208.

When energized, relay 208 causes the tape to be stepped to the next successive symbol for reading by the tape reader. The energization of relay 208 opens contacts 194 in the circuit of valid relay 192 to thus prevent the operation of the valid relay.

If the tape reader reads a valid signal and contacts 88 of relay 95 are held open by the tape, relay 95 remains de-energized so that contacts 100 remain closed and the path the valid circuit established in the upper branch of the relay tree will be determined by the condition of relays 97, 99 and 101. Another valid signal might also actuate relay 95 but would not operate relay 97 and the terminal at which the valid signal would be applied would be one of terminals 168 through 171 depending upon the condition of relays 99 and 101. In this particular embodiment, if both relays 99 and 101 were de-energized then the output signal would be applied to terminal 168, which signal would be fed through its associated diode to valid bus 196 through normally closed contacts 194 of relay 208 and valid relay 192 would be energized. Energization of valid relay 192 closes contacts 210, 212 and 262 in FIGURE 2 and closes contacts 219 in the upper left-hand portion of FIGURE 3.

Assuming that the first set of holes in the tape is an X control signal permitting contacts 87, 88 and 91, 92 to close and holding contacts 89, 90 and 93, 94 open, a valid signal condition exists. Relays 95 and 99 operate and relays 97 and 101 remain de-energized, which combination of relay conditions establishes a relay tree circuit through normally open contacts 102 and 117 and normally closed contacts 108 and 132 to terminal 170. The X control terminal 170 is connected through diode 179 to conductor 21, previously described in connection with FIGURE 1 as connecting relay tree 20 directly to the X control circuit, to tape ignore continuity relay winding 208 and the address input relay winding 216. In each instance lockup paths are provided for these relay windings through normally open contacts 220 and 222 of relay 216. In other words, an X control signal applied to lead 21 will first energize the relay 216 through diode 217 and normally open valid relay contacts 212. The energization of relay 216 closes contacts 220 to provide a holding path for relay 216 and also closes contacts 222 connected in series with relay 208 to energize relay 208 and opens contacts 218 to prevent storage in relays 236–251.

The energization of address input relay 216 also closes contacts 226 serially connected between terminals 96 and 98 of FIGURE 2 by means of the winding of relay 228. Relay 228 is the stepping switch for the X stepping register and corresponds to a portion of the X control circuitry 30 shown in FIGURE 1, while the path established through contacts 226 of relay 216 corresponds to lead 28 between valid-ignore block 24 and X control circuit 30 of FIGURE 1.

The energization of stepping switch coil 228 cocks the relay, opens its normally closed contacts 230, and closes its normally open contacts 231. When stepping switch 228 is de-energized, it steps its stepping contacts SS1, SS2, SS3, SS4 and SS5 to their next position, opens contact 231 closes contact 230. The advance of contact SS1 energizes digit read relay 232 by connecting the winding between terminals 96 and 98. Energization of relay 232 closes contacts 234 in the upper left-hand corner of FIGURE 3 to thus provide a complete circuit between terminals 96 and 98 of FIGURE 3 through whichever ones of contacts 87 89, 91 and 93 are engagement. Still assuming that the stepping switch is in the number one, or extreme left-hand position and also assuming that contacts 87 and 89 are closed by the presence of holes in the punched tape, then storage relays 236 and 240, indicated merely by blocks will be energized. Each of storage relays 236–251 is similar to relay 239 which includes winding 239W and its associated lockup or holding contacts 239C. Thus, once relays 236 and 240 are energized they remain energized until address input relay 216 (FIG. 2) is energized and opens its normally closed contacts 218 (right center of FIG. 3).

The selective energization of relays 236 through 251 causes the contacts (not shown) associated with the energized relay or relays of this group to connect or disconnect as the case may be, a predetermined value of resistance from a Wheatstone bridge and the particular value or values connected or disconnected relative to the bridge can be determined so that the values bear some predetermined relation to each other. The information stored in the relays is in binary form in which relays 236 240, 244 and 248 may be selectively actuated in accordance with a four row transverse portion of the tape when the stepping switch is in its number one position.

It is well known in the art that there are sixteen possible combinations of binary numbers in a four place or four row code. Thus, it is possible to store any one of sixteen bits of information in each horizontal row of relay in the 236–251 group. For the purposes of this description these bits or commands will be designated zero through 9, X, Y and machine functions and the remaining bits of signals will be "ignore" signals. The X axis drive control contacts (not shown) of these relays control, through paths 67, the switching or resistances (also not shown) in a Wheatstone bridge circuit of X automatic setting device 66. Advantageously, these resistances have predetermined values such that they control the X axis drive through a termediate servo system to position the worktable according to decimal portions of an inch. For example, relays 236, 240, 244 and 248 might be used to control the inch setting of the worktable, relays 237, 241, 245 and 249 control the tenths of inches setting, relays 238, 242, 246 and 850 used to control the hundredths of inches setting and relays 239, 243, 247 and 251 used to control the thousandths of inches setting. If all of the resistances controlled by relays 236-251 are connected in the same leg or branch of the Wheatstone bridge, then it is possible accurately to control the resistance in this leg of the bridge. If the bridge is employed to control the position of limit switch for worktable 53 through a servo motor until the servo motor rebalances the bridge in a manner well known in the art, then the combination of the information stored in the relays and the servo system and Wheatstone bridge constitutes a digital to analogue conversion system.

Operation of the system for a typical program

For the purpose of explaining the operation of the system for a given program, this program will be arbitrarily selected to comprise the following steps:

1) an ignore command;
2) a valid machine function command;
3) a valid X command;
4) an ignore command;
5) a valid instruction;
6) end of program.

An ignore or invalid command

In the operation of the system the manual switch 276 is momentarily depressed and the period of actuation corresponds to the time plot (FIG. 4a). At a short interval of time after the closure of contacts 276, tape reader relay 264 is energized, as indicated at plot 4b. The sloping line on the left-hand portion of this plot indicates the time lag during which the current through the coil of relay 264 is building up and the flat portion displaced from the X axis indicates that portion of time during which the relay remains energized. The downwardly sloping right-hand portion of this plot indicates the decay of the flux through the relay armature or the time between the opening of manual switch contacts 276 and the actual opening of the contacts of tape reader relay 264. The operation of the other relays will be similarly depicted. Plot 4c indicates the position of tape engaging pins 86 through 94 of FIG. 3 relative to the tape. That portion of the plot which is displaced from the X axis represents that the pins 86-94 are in tape engaging position and the portion of the plot which is on the X axis represents that the pins are in tape disengaged position, i.e. when the tape reader relay 264 is energized. Similarly, the second, or right-hand portion, of plot 4c which is displaced from the X axis indicates that the pins are again in tape engaging position, which corresponds to the condition which prevails when relay 264 is de-energized and has stepped the tape and moved the pins into tape engaging position. The ignore signal must comprise at least two holes on the tape such that contacts 87, 88 and 89, 90 will be in engagement, thereby energizing relays 95 and 97. The energization of relays 95 and 97 closes contacts 102 and 110, respectively, and the remaining path through the relay tree to the ignore bus 200 will be determined by the condition of relays 99 and 101, i.e. whether the ignore command includes holes to permit engagement of contacts 91, 92 and/or contacts 93, 94. Assuming that the ignore command comprises four holes on the tape such that contacts 87-94 are closed and relays 95, 97, 99 and 101 are energized, the binary digit or command signal will be "1111" and a path will be established through contacts 102, 110, 119 and 137, terminal 175, and the serially connected diode to the ignore bus 200, causing ignore relay 198 to be energized. Energization of the ignore relay 198 is represented by the plot 4a in which the left-hand origin corresponds to the point in time at which the circuit through the ignore relay is established when the pins P engaged the tape. The sloping line indicates the time during which the relay coil is becoming saturated and the flat portion displaced from the X axis corresponds to the time during which relay 198 is energized. When ignore relay 198 is energized, it closes its contacts 206, thereby completing the energized circuit of tape ignore continuity relay 208, the operation of which is indicated by time plot 4e. After the tape ignore continuity relay 208 is energized it closes its contacts 209 shown in the lower left portion of FIG. 2, energizing tape reader relay 264, as indicated by time plot 4f. The energization of tape reader relay 264 withdraws tape contacting pins 86–94 which had previously been in contact engaging position as indicated by the initial portion of time plot 4g. Tape ignore continuity relay 208 releases its energizing path through the relay tree and is interrupted by the release of relays 95, 97, 99 and 101 when the pins 88, 90, 92 and 94 are moved from their tape engaging position. After the tape reader 264 is de-energized it steps the tape to the next command signal and moves pins 86 through 94 to a tape engaging position, as indicated by the right-hand portion of plot 4g.

Valid machine function command

Assuming that valid machine function instruction or commands, such as tool indexing, comprising tape holes 0001, where the zeros represent the tape holes, is read to generate the binary digit "1110" next in the sequence of operation, the relay 101 will remain de-energized and relays 95, 97 and 99 will be actuated. In other words, holes appear in the tape permitting contacts 87, 88 and 89, 90 and 91, 92 to close. This combination of relay actuation establishes a path through contacts 102, 110, 119 and 136 to terminal 174 in the relay tree, depicted in FIG. 2. Valid relay 192 is energized by the establishment of this circuit through the relay tree to terminal 174, through the associated diode, valid bus 196, and contacts 194 of relay 208. Terminal 174 is connected through channel 23 to suitable controls (not shown) in machine functions 26. The controls in the machine functions section 26 are energized to perform the predetermined operation, such as tool indexing. The completion of the circuit of valid relay coil 192 is indicated at the origin of the time plot of FIG. 4h⁰. At the completion of this circuit the current begins to rise in the valid relay as indicated by the sloping line until relay 192 is saturated, as indicated by the flat portion of the plot which is displaced from the X axis. Energization of the valid relay causes it to close its normally open contacts 210, 212 and 262. Closure of contacts 212, in the upper right-hand corner of FIG. 2, has no effect upon address input relay 216 because the path through the relay tree to terminal 170 is open at contact 108. Similarly, the closure of contact 210 has no effect upon the stepping switch relay coil 228 because contacts 260 of digit read relay 232 are open. With respect to the contacts 262, however, the closure of these contacts completes the energizing circuit of tape reader 264.

In response to the closure of contacts 262, tape reader 264 is energized, FIG. 4l⁰, withdrawing pins including pins 91 through 94 from engagement with the tape, thereby releasing the energizing circuit of the valid relay 192 and in turn de-energizing tape reader relay 264, causing the pins 86 through 94 to again move into tape engaging position. The system is now in a condition to take the next command from the tape.

Valid X command

If the next command or digit on the tape moved into position by the last mentioned de-energization of tape reader relay 264 is a valid X signal, the relays 95 and 99 will be energized and relays 97 and 101 will be de-energized. In other words, holes appear at contacts 87, 88 and 91, 92, while contacts 89, 90 and 93, 94 are separated by the tape. Thus a path will be established through the relay tree by way of contacts 102, 108, 117 and 132 to terminal 170 and through channel 21 to address input relay 216 and diode 217, the circuit being open at valid contacts 212. Because terminal 170 is connected through a diode to the valid bus 196, the valid relay 192 will be energized, as indicated in time plot $4h$ to close valid contacts 212 which completes the energizing circuit of address input relay 216, the operation of which is indicated by plot $4i^1$. Relay 216 closes its own lock-up contacts 220 and contacts 222 in the tape ignore continuity relay 208 circuit, thereby causing relay 208 to be energized, as indicated by plot $4j^1$. The closure of address input contacts 226 completes the energizing circuit of stepping switch coil 228, thereby causing stepping switch 228 to energize, as shown in $4k^1$, cocking its relay, opening its contact 230 and closing its contact 231. The closure of contact 262 energizes tape reader relay 264, plot $4l^1$, which in turn retracts pins 86 through 94, plot $4m^1$, and de-energizes relays 192 and 216 by the retraction of the tape engaging pins. When address input relay 216 opens, it opens its associated contacts 226, de-energizing the stepping switch 228, which steps to its next (in this instance the number one or left-hand) position, closes contact 230 and opens its contact 231. The opening of contact 231 de-energizes the tape reader relay 264, causing the tape reader to de-energize, advance the tape and return contacts 86 through 94 into tape engagement. Because stepping switch SS1 is in its first or extreme left-hand position, digit read relay 232 is energized, plot $4n^1$. The energization of digit read relay 232 closes its contacts 260 and will continue to keep them closed until the stepping switch 228 has been stepped beyond its fourth position disconnecting digit read relay 232. The system is now in a condition to accept valid X position instructions and to ignore instructions which are invalid. Accordingly, the operation of the system will now be described with respect to an ignore instruction.

*Ignore instruction*

Assuming the next digit or command on the tape is one which is to be ignored, for example, one in which holes appear to permit closure of contacts 87 through 94, the relays 95, 97, 99 and 101 will be energized, establishing a path through contacts 102, 110, 119 and 137 of the relay tree to terminal 175 and through the associated diode to ignore bus 200, thereby energizing ignore relay 198, plot $4o^2$. Energization of ignore relay 198 closes its contacts 206, thereby energizing tape ignore continuity relay 208, plot $4j^2$. The energization of relay 208 causes this relay to close its contacts 209, thereby energizing the tape reader relay 264, plot $4l^2$, causing it to withdraw the tape engaging pins 86 through 94, $4m^2$, thereby interrupting the path through the relay tree and causing de-energization of ignore relay 198 and 206. Relay 198 opens its contacts 206 and de-energizes tape ignore continuity relay 208, which in turn opens its contacts 209. The opening of contacts 209 de-energizes tape reader relay 264, causing it to step the tape and again bring contacts 86 through 94 into tape engaging position. The system is now ready to receive the next instructions and it will be assumed that the next instructions are four valid X position indicating instructions. If, however, the next instruction were an ignore instruction, the system would cooperate to repeat the sequence of relay operations described above in this section.

*Valid instruction*

The first valid X position instruction establishes a path through the relay tree to the valid bus 196, by selective energization of relays 95, 97, 99 and 101. For example, assume that relays 95 and 101 are energized by the presence of holes in the tape which permit closure of contacts 87, 88 and 93, 94, while the relays 97 and 99 are prevented from being energized by the tape between these contacts. With this combination of relay operations, a path is established through the relay tree through contacts 102, 108, 116 and 131 to terminal 169, through its associated diode to valid bus 196. The receipt of this valid signal is indicated by time plot $4h^3$. Energization of the valid relay 192 causes the stepping switch 228 to be energized through digit read contacts 260 and valid relay contacts 210, the energization of which is indicated by time plot $4k^3$ and contact 262 is also closed to energize tape reader 264 during machine function command as previously described. Stepping switch 228 closes its contact 231 to energize tape reader 264, plot $4l^3$. When the tape reader relay 264 energizes it withdraws the pins 86 through 94 from tape engaging position, thereby interrupting the circuit through the relay tree, which contact disengagement is indicated by time plot $4m^3$ in which the plot follows the X axis. Because the disengagement of tape engaging pins de-energizes valid relay 192, which in turn opens its contacts 262, de-energizing tape reader relay 264, the tape reader relay steps the tape and again brings the contacts into tape engaging position. It is understood, of course, that because the stepping switch contacts SS2, SS3, SS4 and SS5 were in their extreme left or No. 1 position, the valid signal or command will have established a path through the appropriate contacts to the storage relays 236 and 251 by way of normally closed address input contacts 218. Because the first four contacts of SS-1 are bridged and complete the energizing circuit of digit read relay 232, which in turn closes its contacts 234 (upper left of FIG. 3), the next four valid signals will be stored in relays 236–251 except for a valid X which would operate address input relay 216, which would open contacts 218 (right side of FIG. 3) and thus prevent storage.

Under the previous assumption that relays 95 and 101 were operated, pins 87 and 93 will also be engaged to thereby define paths for relays 236 and 248, respectively, thereby energizing these relays and causing relays 236 and 248 to establish lock-up paths through their associated lock-up contacts (not shown). When the stepping switch is de-energized by the opening of the valid relay contacts 210, the stepping switch 228 steps to its next position, opening contacts 231, thereby de-energizing tape reader relay 264, which in turn moves the contacts 86 through 94 into tape engaging position to again read a command. Assuming that four valid commands are read through the cooperation of stepping switch relay 228 and the tape reader relay 264, the stepping switch will then be stepped to its fifth position, i.e., one in which it establishes a path through contact 230, diode 229, and stepping switch coil 228.

Switch 230 and diode 229 constitute the stepping switch 228 "running home" circuit for restoring the stepping switch to its initial or quiescent condition, shown in FIG. 2. The interlock relay 266 is connected in parallel with this running home circuit and opens its contacts 267 and 269 in the circuits of the stepping switch coil 228 and the tape reader 264, respectively, when the parallel circuit is energized. The opening of contacts 267 prevents energization of the stepping switch coil 228 through any path other than the running home circuit and the opening of contacts 269 prevents energization of the tape reader during the running home operation. Rectifier or diode 229 prevents relay 266 from being energized when stepping switch coil 228 is energized through either contacts 226 or 210, 260. The running home sequence of the stepping switch SS1 takes place by the energization of the stepping coil 228 and the interruption of this circuit when the associated contact 230 is opened upon energization of the stepping switch coil. This opening of switch 230 causes the stepping switch coil to be de-energized and the stepping switch to step to its next position and also closes switch 230, thereby re-establishing the energizing circuit of coil 228. The sequence of stepping switch 228 is shown in plot $4k^4$, while the de-energization of tape reader relay 264 is shown in plot $4l^4$. Because the ape reader relay is de-energized during the running home operation the tape reader pins remain in tape engaging position, as indicated by plot $4m^4$. As previously mentioned, the interlock relay remains energized during this running home operation, as indicated by plot $4p^4$. As previously mentioned, the digit read relay is de-energized after the stepping switch is stepped from its fourth position to its fifth position, and this condition is indicated in plot $4n^4$. The stepping switch 228 is now restored to its initial or quiescent condition and the system is otherwise ready to respond to a valid or an ignore signal.

When stepping switch SS1 engages its right-hand contact, as viewed in FIG. 2, the execute relay 271 is energized. This relay through its contacts (not shown) connects the circuit indicated by line 62 in FIG. 1 to thereby energize the X axis drive motor so that the motor moves in the X axis direction until the previously mentioned limit switch is positioned. When the magnet secured to the workable is moved to a position to actuate the limit switch, worktable movement stops and a completion circuit is established through the limit switch. The magnet closes the limit switch and the circuit which includes this limit switch delivers a completion command to the tape reader to control the tape reader in an automatic manner such that the tape reader is energized and thereby continues to read the program on the tape after the bridge is balanced, it being understood, of course, that when the bridge is balanced the workpiece mounted on the worktable is in a predetermined position to be engaged by the tool. The completion command circuit is indicated schematically in the lower portion of FIG. 2 as a limit switch 274 connected in parallel with manual start switch 276.

With the receipt of the completion command signal by the tape reader from switch 274 the system has completed the X command operation and the worktable is positioned at its predetermined position along the X axis, as determined by the respective X command. A similar series of operation can now be employed to position the worktable along the Y axis through the use of a permutation or binary signal which causes the establishment of a path to terminal 171 of FIG. 2 which terminal is, of course, connected to the Y control circuitry as indicated by line 25 in FIG. 1. This Y control circuitry, as previously mentioned, is identical to the X control circuitry, as is the remaining portion of the system which operates the Y axis drive. Because of the ability of the system to discriminate between valid and ignore signals, it is not necessary that the signals immediately following the X control signals be the Y control signals and suitable machine functions may be interspersed between these address signals. At the completion of the entire program the system must be turned off and usually the completed workpiece is removed and a new workpiece is inserted or mounted on the worktable. With this convenient means of programming, however, other programs may be employed simply by inserting new tapes in the tape reader and the response of the system may be readily modified by changing the straps which connect the valid or ignore buses 196 and 200, respectively, to the diode output circuits connected to the respective output terminals 160 through 175 of the relay tree.

End of program

As mentioned above, when any program is completed it is necessary to de-energize the system while assuring that the system is in its normally quiescent condition ready to receive the next program. Advantageously, this condition is obtained by a single hole in the permutation tape, which hole permits contacts 86 in the upper left-hand corner of FIG. 3 to close. This energizes relay 85, which relay is also shown in the right center of FIG. 2. When relay 85 is energized it opens contact 282 serially connected in the energizing circuit of tape reader relay 264, thereby de-energizing the tape reader so that the tape reader relay will step and lower the contact energizing pins into engagement with the tape. The entire program is now completed and because the stepping switches SS1–SS5 have been stepped to their extreme right-hand position, as indicated in FIGS. 2 and 3, the system is now in condition to receive the next program.

While I have shown and described one illustrative embodiment of this invention, it will be understood by those skilled in the art that numerous other specific structures may be employed to perform the functions set forth, without departing from the spirit and the scope of this invention.

What is claimed is:

1. In a machine control system the code reader for reading in sequence words of coded information representing data of a machine operation including the operation of moving a tool relative to a workpiece, storage means to register in sequence coded data to be performed by the machine, permutation responsive means for providing different outputs in response to each different word, circuit means coupled to the output of said permutation responsive means to provide a valid indication for certain of said outputs to be accepted by the machine and an invalid indication in response to other of said outputs to be ignored, switching means separate from said permutation responsive means for connecting said code reader to said storage independently of said permutation responsive means for setting at least part of said storage means from said code reader in accordance with the words being read by said code reader, first control means responsive to said circuit means for actuating said switching means to set said storage means from said code reader including a control element responsive to said valid indication and second control means responsive to said invalid indication to effect an indexing of said code reader to read the next word.

2. In a machine control system as defined in claim 1 wherein said first control means includes a stepping mechanism conditioned in response to a predetermined unique address word to set a predetermined number of the next following valid words into said storage means.

3. In a machine control system as defined in claim 2 wherein said switching means includes an additional stepping mechanism condition in response to a predetermined unique address word for connecting said code reader to different parts of said storage means.

4. In a machine control system as defined in claim 1 wherein said circuit means includes valid indicating means selectively connectable to said permutation responsive means to respond to any of a plurality of selected ones of said outputs and invalid indicating means selectively connectable to said permutation responsive means to respond to any of a plurality of selected ones of said signals.

5. In a machine control system as defined in claim 2 wherein said circuit means includes valid indicating means selectively connectable to said permutation responsive means to respond to any selected ones of said outputs and invalid indicating means selectively connectable to said permutation responsive means to respond to any selected ones of said outputs.

6. In a machine control system as defined in claim 3 wherein said circuit means includes valid indicating means selectively connectable to said permutation responsive means to respond to any selected ones of said outputs and invalid indicating means selectively connectable to said permutation responsive means to respond to any selected ones of said outputs.

7. In a control system for controlling the operations of a machine tool, a code reader for reading in sequence individual code words which represent data for machine operation or functions to be performed, storage means for registering said data, permutation responsive means for decoding each of the individual words read and responsive to said code reader for providing a different individual output in response to different ones of said words representing different machine data, first electrical means responsive to certain of said outputs for words to be set into the machine for effecting the indexing of the code reader to a subsequent word, second means responsive to other of said outputs for words for a machine operation or function not to be performed for indexing said code reader without effectively setting the machine to operate in accordance with the word, and means for selectively changing the outputs to which said first and second means are responsive, said permutation responsive means having an output terminal for each of said different words and said first electrical means comprising a valid two state switching means connectable selectively to any of a plurality of said terminals to indicate a valid word to be received by said machine and an ignore two state switching means selectively connectable to any of a plurality of selected ones of said terminals to index the code reader in response to a signal thereon without effectively setting the machine to operate in accordance with the word.

References Cited

UNITED STATES PATENTS

| | | | |
|---|---|---|---|
| 3,125,796 | 3/1964 | Brainard | 340—147 |
| 3,215,983 | 11/1965 | Kilroy | 340—147 |
| 3,226,677 | 12/1965 | Forrester et al. | 340—147 |

NEIL C. READ, *Primary Examiner.*

THOMAS B. HABECKER, *Examiner.*

H. I. PITTS, *Assistant Examiner.*